US008066873B2

(12) United States Patent
Kaw

(10) Patent No.: US 8,066,873 B2
(45) Date of Patent: Nov. 29, 2011

(54) FLOATING BIOREACTOR SYSTEM

(76) Inventor: Eros G. Kaw, San Mateo, CA (US)

( * ) Notice: Subject to any disclaimer, the term of this patent is extended or adjusted under 35 U.S.C. 154(b) by 0 days.

(21) Appl. No.: 12/982,669

(22) Filed: Dec. 30, 2010

(65) Prior Publication Data

US 2011/0132822 A1 Jun. 9, 2011

Related U.S. Application Data

(60) Provisional application No. 61/317,715, filed on Mar. 26, 2010.

(51) Int. Cl.
*C02F 3/06* (2006.01)

(52) U.S. Cl. .............. 210/150; 210/170.02; 210/170.05; 210/170.06; 210/170.09; 210/170.1; 210/242.2

(58) Field of Classification Search .................. 210/150, 210/151, 167.22, 167.26, 170.02, 170.05, 210/170.06, 170.08, 170.09, 170.1, 170.11, 210/220, 242.1, 242.2, 615, 617

See application file for complete search history.

(56) References Cited

U.S. PATENT DOCUMENTS

| | | | | |
|---|---|---|---|---|
| 3,169,921 A * | 2/1965 | Griffith | ..................... | 210/170.06 |
| 3,235,234 A * | 2/1966 | Beaudoin | ................... | 210/242.2 |
| 5,122,266 A * | 6/1992 | Kent | .............................. | 210/150 |
| 5,202,027 A * | 4/1993 | Stuth | ............................. | 210/151 |
| 5,228,998 A * | 7/1993 | DiClemente et al. | ...... | 210/170.1 |
| 5,344,557 A * | 9/1994 | Scanzillo | ................. | 210/170.05 |
| 5,507,950 A * | 4/1996 | Senda et al. | ................... | 210/150 |
| 5,565,096 A * | 10/1996 | Phelan | ..................... | 210/170.05 |
| 5,811,164 A * | 9/1998 | Mitchell | ...................... | 428/36.5 |
| 6,022,476 A * | 2/2000 | Hausin | ..................... | 210/170.09 |
| 6,348,147 B1* | 2/2002 | Long | ............................. | 210/150 |
| 6,878,279 B2* | 4/2005 | Davis et al. | ................... | 210/615 |
| 7,452,468 B2* | 11/2008 | Smith | .......................... | 210/617 |
| 7,615,156 B2* | 11/2009 | Lenger et al. | ................. | 210/150 |
| 7,622,040 B2* | 11/2009 | Mitchell et al. | ............ | 210/242.2 |
| 7,794,590 B2* | 9/2010 | Yoshikawa et al. | ...... | 210/167.22 |
| 2005/0269262 A1* | 12/2005 | McBride | ...................... | 210/150 |

* cited by examiner

*Primary Examiner* — Christopher Upton
(74) *Attorney, Agent, or Firm* — Ray K. Shahani, Esq.; Kin H. Lai

(57) ABSTRACT

An aeration and microbial reactor system for use in decontaminating water including a housing adapted to float within the medium such that a top portion thereof remains adjacent a top surface of the contaminated water while the bioreactor containing inoculated carrier media is attached below. Beneficial microbial populations thrive and spread throughout the liquid medium, and consume or fix the contaminant such that the contaminant is removed from the water.

7 Claims, 15 Drawing Sheets

PGI-101

PGI-101

FLOATING BIOREACTOR SYSTEM

RELATED APPLICATIONS

This Application is a Nonprovisional patent application related to U.S. Provisional Patent Application Ser. No. 61/317,715 filed Mar. 26, 2010 entitled "FLOATING BIOREACTOR SYSTEM", which is incorporated herein by reference in its entirety, and claims any and all benefits to which it is entitled therefrom.

FIELD OF THE INVENTION

The present invention pertains to an aeration device and microbial bioreactor system for use in a liquid medium. More specifically, the invention relates to floating bioreactor systems that can be adapted to applications for treatment of water, leachate and industrial waste in rivers, streams and creeks, as well as water in aquariums and domestic septic systems.

BACKGROUND OF THE INVENTION

Subsurface aeration seeks to release bubbles at the bottom of the pond and allow them to rise by the force of gravity. Diffused aeration systems utilize bubbles to aerate as well as mix the pond. Water displacement from the expulsion of bubbles can cause a mixing action to occur, and the contact between the water and the bubble will result in an oxygen transfer.

Bioreactors are also designed to treat sewage and wastewater. In the most efficient of these systems there is a supply of free-flowing, chemically inert media that acts as a receptacle for the bacteria that breaks down the raw sewage. Aerators supply oxygen to the sewage and media further accelerating breakdown. In the process, the liquids Biochemical Oxygen Demand BOD is reduced sufficiently to render the contaminated water fit for reuse. The biosolids are collected for further processing or dried and used as fertilizer, agricultural feed, etc.

Subsurface aeration, bioreactors and most likely a combination of both are commonly employed to treat sewage water, recycle wastewater and other water treatment applications both industrially or domestically.

SUMMARY OF INVENTION

The present invention relates to a system that consists of an apparatus for aerating and circulating a liquid medium and at the same time an apparatus for the continuous microbial bio-remediation of organic waste in rivers, sewers and other waste laden environments utilizing in-situ microbial seeding.

The present invention is a microbe bio-reactor designed to work in open water such as lakes and ponds and in lagoons and tanks to clean up water biologically. It can clean tip water in a short amount of time and will be energy efficient. It works by having imbedded microbes in, and these are stores in its main reactor chamber that is a slotted pipes.

The core of its main reactor chamber is a perforated hose. Air is pumped into the perforated hose and is released all along the pipe. The air is diffused in the water surrounding this and this causes the water to rise and it circulate the microbe with the dirty water. This feeds the microbes imbedded in the media and this causes the microbes to replicate and thus releasing billions of microbes every second. As the microbes are release upward it is oxygenated greatly by the main hose diffusers and this causes the microbes to multiply even much more.

At the top of the water, the water is pushed out and is mixed causing even more microbial growth. At the surface of the water, it again is exposed to the atmosphere and is not only evenly spread out, it is again oxygenated and thus multiplying organisms even more.

The microbes create an even larger zone of air and/or oxygen transfer to the water, thus facilitating even more microbial growth. Thus, all along the water flow cycle, the present invention generates even more microbes in the expense of minimum electricity usage of the approximate range of 2 HP.

As the water is pulled down under the tank or water body, it pulls down not only microbes but increases dissolved oxygen such that microbial growth at the bottom of the tank or water body is greatly enhanced. Thus, water is cleaned and revived. In addition, the process removes hydrogen sulfide present in the contaminated water or other liquid medium. The process also reduces methane, a green house gas, formation to help preserve the environment.

An advantage of the present invention is that biosolids and/or sludge handling is eliminated. The biosolids are eaten up and consumed by the microbes, thus eliminating the need for sludge and biosolids handling equipment, disposal, etc. In addition, having the microbes on the surface of the water increases the efficiency of oxygen transfer in the bioreactor.

Another object of the present invention is the very small amounts of electricity consumed due to high efficiency which helps to reduce energy consumption.

Another object of the present invention is that the biosafety level one microbes can inhabit the micropores in the rocks and river beds of the streams and keep on improving even after the bioreactor is disengaged although the effect is much better to leave it in place.

Another object of the present invention is that even without expensive membrane filters, the bioreactor can be applied to sewage with results that clean waste water to body less than 5 or less than 1 and then it is percolated and the treated waste water can recharge ground water.

DETAILED DESCRIPTION OF THE PREFERRED EMBODIMENT

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

DEFINITION OF TERMS

Standard Oxygen Transfer Rate [SOTR] —Pounds of oxygen transferred to water per hour [lbs $O_2$/hour]. SOTR is measured in clean water when the dissolved oxygen [DO] concentration is zero at all points in the water volume, the water temperature is 20° C., at a barometric pressure of 1.00 atm [101 kPa].

Standard Aeration Efficiency [SAE]—Standard Oxygen Transfer Rate per unit total power input. SAE is typically expressed as the pounds of oxygen transferred to the water per hour per HP [lbs $O_2$/hour/HPwire], and is sometimes referred to as SAE Wire. SAE is used as a measure of how efficiently an aerator is transferring oxygen.

Figure 1A:
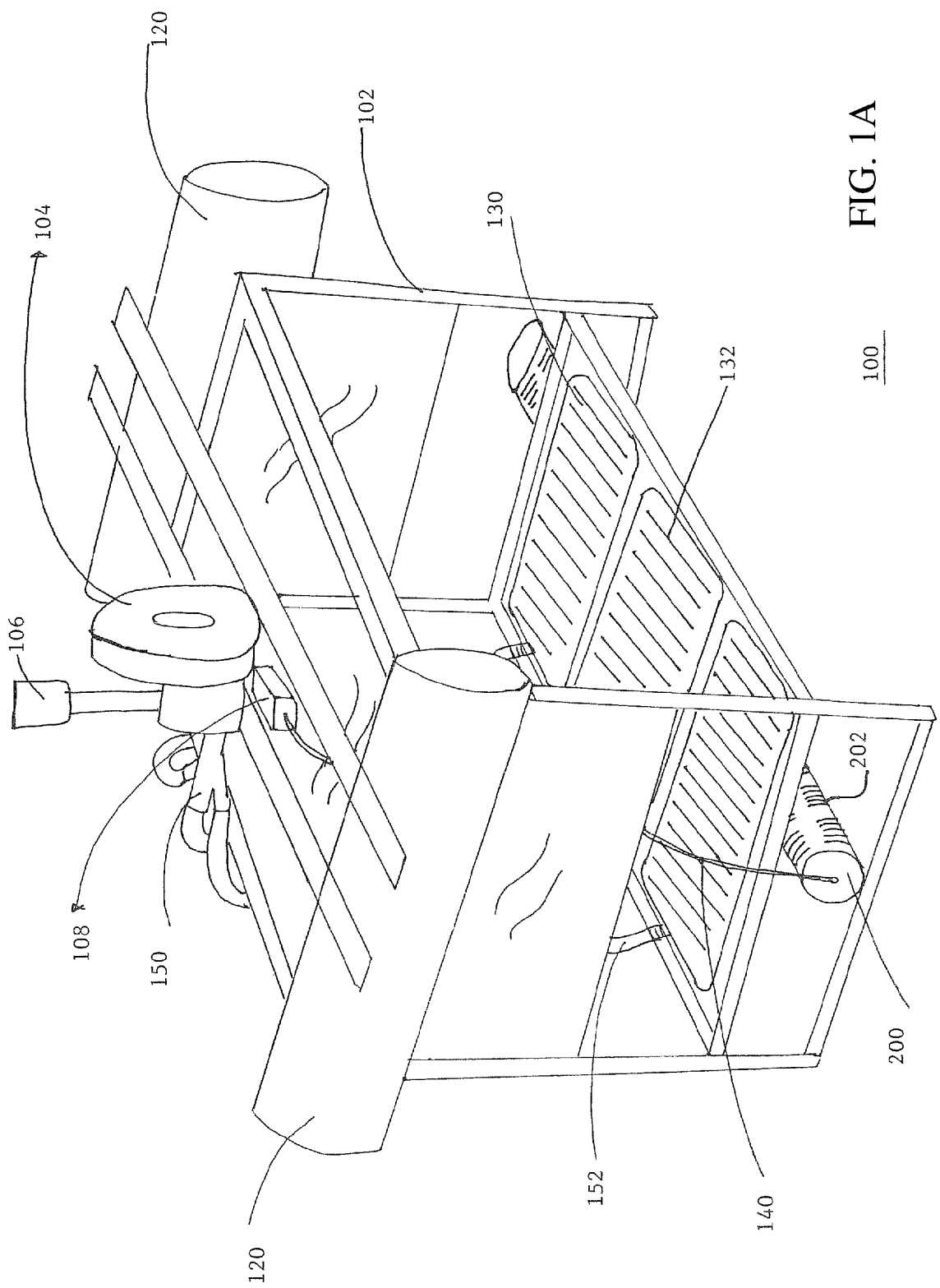
FIG. 1A is a representative upper front perspective view of floating bioreactor system 100 of the present invention.

FIG. 1A is a representative upper front perspective view of floating bioreactor system 100 of the present invention. Floating bioreactor system 100 of the present invention has a housing 102. In one embodiment, housing 102 is made of fiberglass that is strong enough to support the weight of the entire floating bioreactor system 100 without the assistance of buoyance and is not prone to corrosion, degradation in the presence of water and/or other liquid medium, including salt water or waste water with other chemicals. Housing 102 of floating bioreactor system 100 can be assembled by nuts and bolts or other optimal mechanical fastening means. As shown in FIG. 1A, a plurality of floats 120 are attached to housing 102 on both sides. The main function of floats 120 is to lend buoyance to the entire floating bioreactor system 100 such that the present invention is able to float and maintain an appropriate buoyance level within the liquid medium. Optionally, floats 120 are inflatable or otherwise adjustable so buoyancy and waterline of the overall housing 102 can be adjusted.

As shown in FIG. 1A, blower 104 is placed on top of housing 102. In one embodiment, blower 104 is a 1.75 kW regenerative blower which is an ideal solution for moving large volume of air at lower pressures or near vacuum. The main function of blower 104 is to be an air source for the aeration process of the present invention 100. Using blower 104 can be one of the most cost effective methods for producing pressure or vacuum. Filter 106 cleans particulate from the air that goes in and through blower 104 to avoid dust or oil in contact with diffuser grids 130.

As best shown in FIG. 1A, blower 104 is connected to diffuser grids 130 via diverter 150 and subsequently hoses 152. Hoses 152 are attached to diverter 150 to receive the necessary air for diffuser grids 130. In one embodiment, diverter 150 spreads the air generated from blower 104 evenly to diffuser grids 130 via a plurality of hoses 152. The main function of diffuser grids 130 is to create aeration within the liquid medium that the present invention 100 is trying to clean. In alternative embodiments, multiple diffuser grids 130 can be installed and connected to blower 104 to increase overall effectiveness and scale of cleaning power of floating bioreactor system 100 of the present invention.

For efficient aeration system, whether it is an aeration system or device splashes, sprays, or diffuses air, an important factor is how much surface area it creates. The surface area is where water/liquid medium contacts air and where oxygen transfer takes place. Smaller bubble size results in more surface area, which is why fine bubble aeration devices are superior in oxygen transfer than coarse bubble aerators. To maximize aeration efficiency in a system, an aerator must create fine bubbles while expending a minimum amount of energy. The main purpose is to have a high SOTR and SAE for the aeration system.

In one embodiment, there are a number of commercially available diffuser grids 130 that can be incorporated in the floating bioreactor system 100 of the present invention. Most of these models resemble what has been disclosed in U.S. Pat. No. 5,811,164, issued Sep. 22, 1998 to Mitchell entitled "AERATION PIPE AND METHOD OF MAKING SAME", which is incorporated herein by reference in its entirety. One of the commercial models is Aero-Tube™ diffuser grids. One of the most important structure for the extremely high performance and efficiency of diffuser grids 130 is the adaptation of hose segments 132 which, through a unique combination of technique and raw material, creates numerous micro-pores 134 throughout the length of hose segments 132. These micro-pores 134 create tiny air bubbles and hence high surface area, which allows the efficient transfer of air into the water. In one embodiment, diffuser grids 130 are made up of hose segments 132. Preferably, hose segments 132 are made from thermoset polymer particles in a matrix of thermoplastic binder material, which may be made according to a method described in the '164 patent.

In one embodiment, the specifications of hose segments 132 are in the approximate range as follows: Outside Diameter, 1.00 inch (2.54 cm); Inside Diameter, 0.500 inch (1.27 cm); Wall Thickness, 0.250 inch (0.635 cm); Weight, 0.220 lbs per foot (0.327 kg per meter); Roll Length, 200 ft. (60.98 meters); Roll Weight, 44 lbs. (19.9 kg); Burst Pressure, 80 PSI (5.5 bar).

Due to the number of pores created during the manufacturing process, there is little resistance created when pushing air through hose segments 132. Resistance equals energy demand hence diffuser grids 130 uses significantly less horsepower when compared with traditional methods of aeration such as bubblers, paddlewheels, aspirators, less efficient tubing, etc. Moreover, diffuser grids 130 bare tiny pore size which creates bubbles with extremely small diameters. The smaller the gas bubbles, the more efficiently they transfer oxygen into water. Small bubbles also take longer to rise once they are introduced into water. Slower rising, small-diameter bubbles mean more contact with the water and a much higher rate of oxygen transfer. By creating significantly smaller bubbles, more efficiently, diffuser grids 130 are able to deliver high rates of oxygen transfer [SOTR] and energy efficiency [SAE].

As shown in FIG. 1A, bioreactor pump 108 is also mounted on housing 102. In one embodiment, bioreactor pump 108 is a relatively less powerful pump in the range of about 60 W that supplies air to the in situ bioreactor container 200. Bioreactor hose 140 that connects bioreactor 200 also transfers air from bioreactor pump 108 to the bioreactor 200 for the biocarrier media therein. Air and nutrients are supplied to the microbial population which are located within the biocarrier media. In one embodiment, bioreactor 200 is secured at the bottom of housing 102 and underneath diffuser grids 130 to provide continuous in-situ addition of beneficial microbes directly within an environment to be treated thereby permitting optimized mineralization of waste being treated as well as acclimation of the microbes to such waste.

Figure 1B:
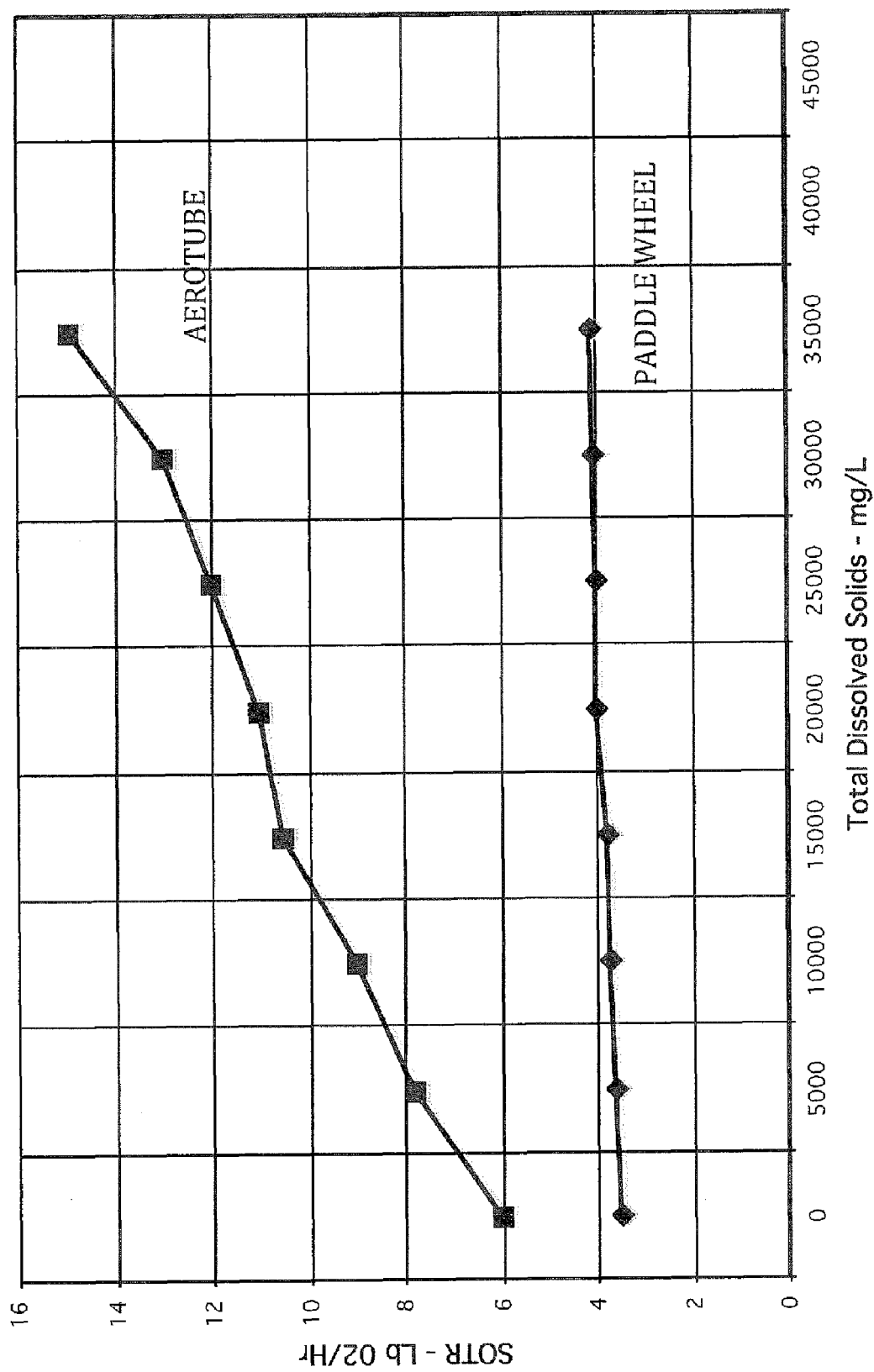
FIG. 1B is a representative graph showing the relationship between Standard Oxygen Transfer Rate [SOTR] and various Total Dissolved Solids [TDS] values of the liquid medium.

FIG. 1B is a representative graph showing the relationship between Standard Oxygen Transfer Rate [SOTR] and various Total Dissolved Solids [TDS] values of the liquid medium of both commercial diffuser grids 130 and traditional aeration device like paddle wheel. As best shown in FIG. 1B, diffuser grids 130 performs better than paddle wheel throughout the range of TDS from 0 to approximately 35,0000 mg/L. This demonstrates that using diffuser grids 130 is an effective, improved method for aeration [higher SOTR].

Figure 1C:
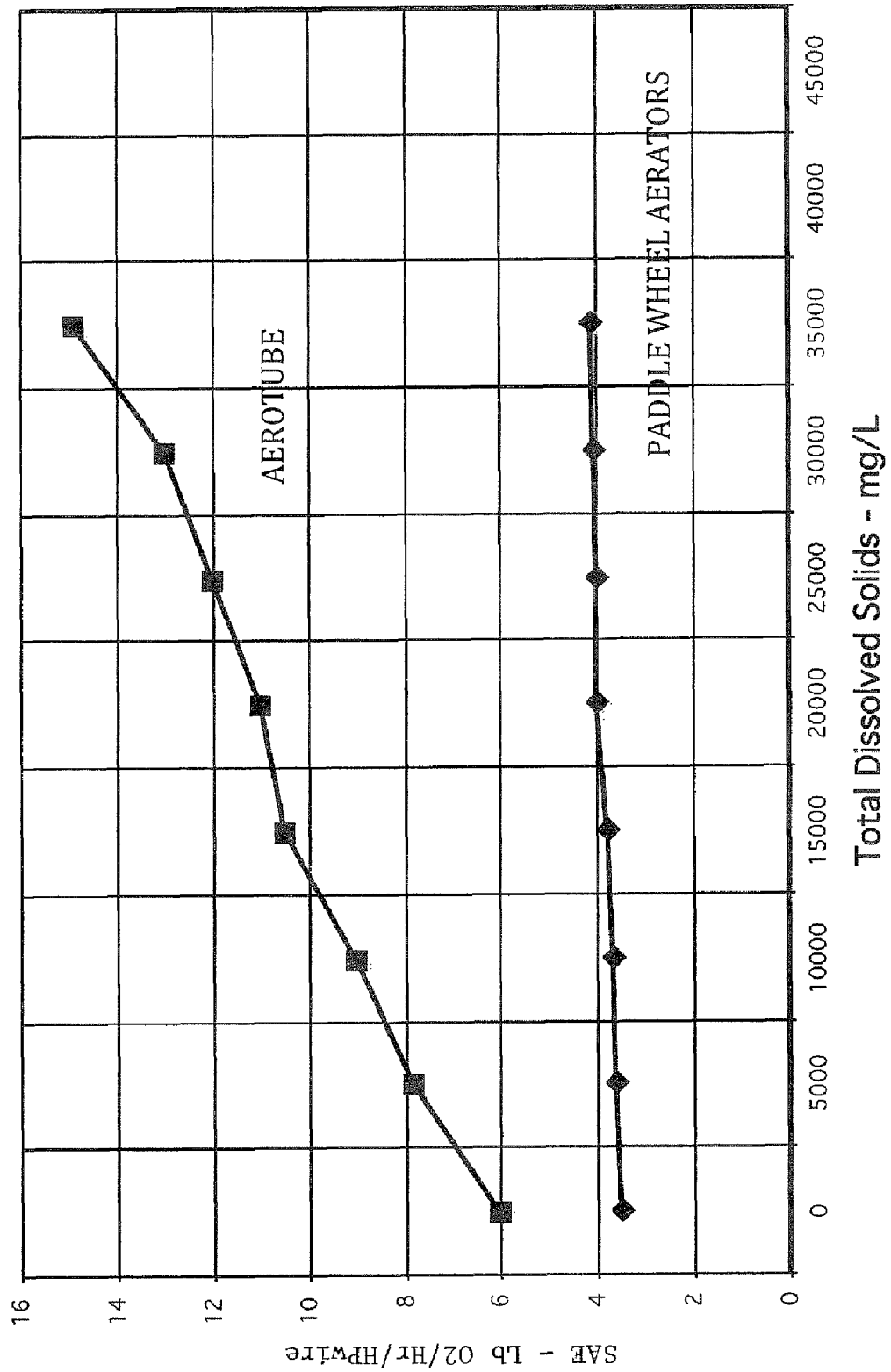
FIG. 1C is a representative graph showing the relationship between Standard Aeration Efficiency [SAE] and various Total Dissolved Solids [TDS] values of the liquid medium.

FIG. 1C is a representative graph showing the relationship between Standard Aeration Efficiency [SAE] and various Total Dissolved Solids [TDS] values of the liquid medium of both commercial diffuser grids 130 and traditional aeration device like paddle wheel. As best shown in FIG. 1C, diffuser grids 130 performs better than paddle wheel throughout the range of TDS from 0 to approximately 35,0000 mg/L. Proofing that using diffuser grids 130 is a much more cost efficient method for aeration [higher SAE].

Figure 1D:
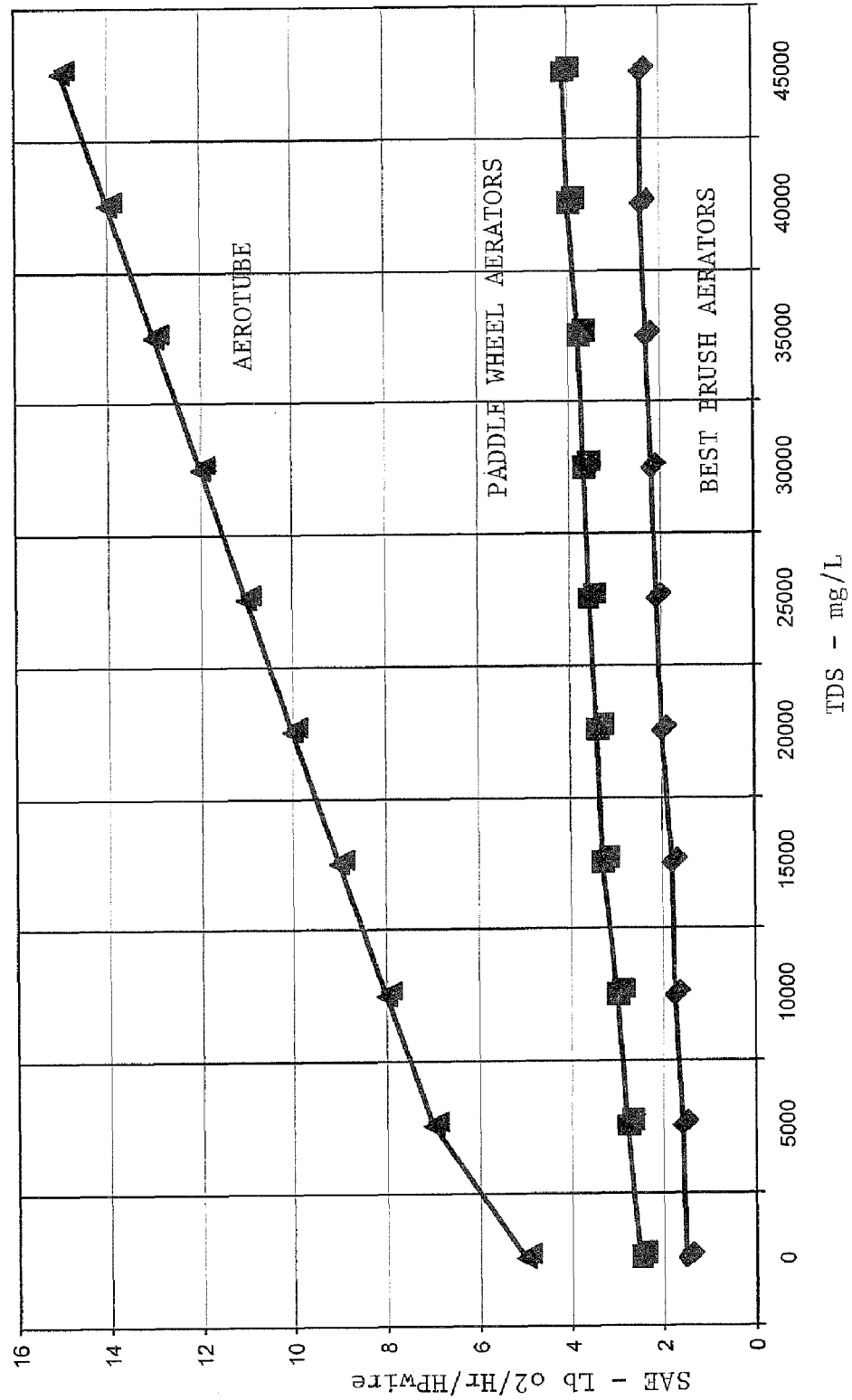
FIG. 1D is a representative graph showing the relationship between Standard Aeration Efficiency [SAE] and various Salt Concentration [TDS] values of the liquid medium.
Figure 1E:
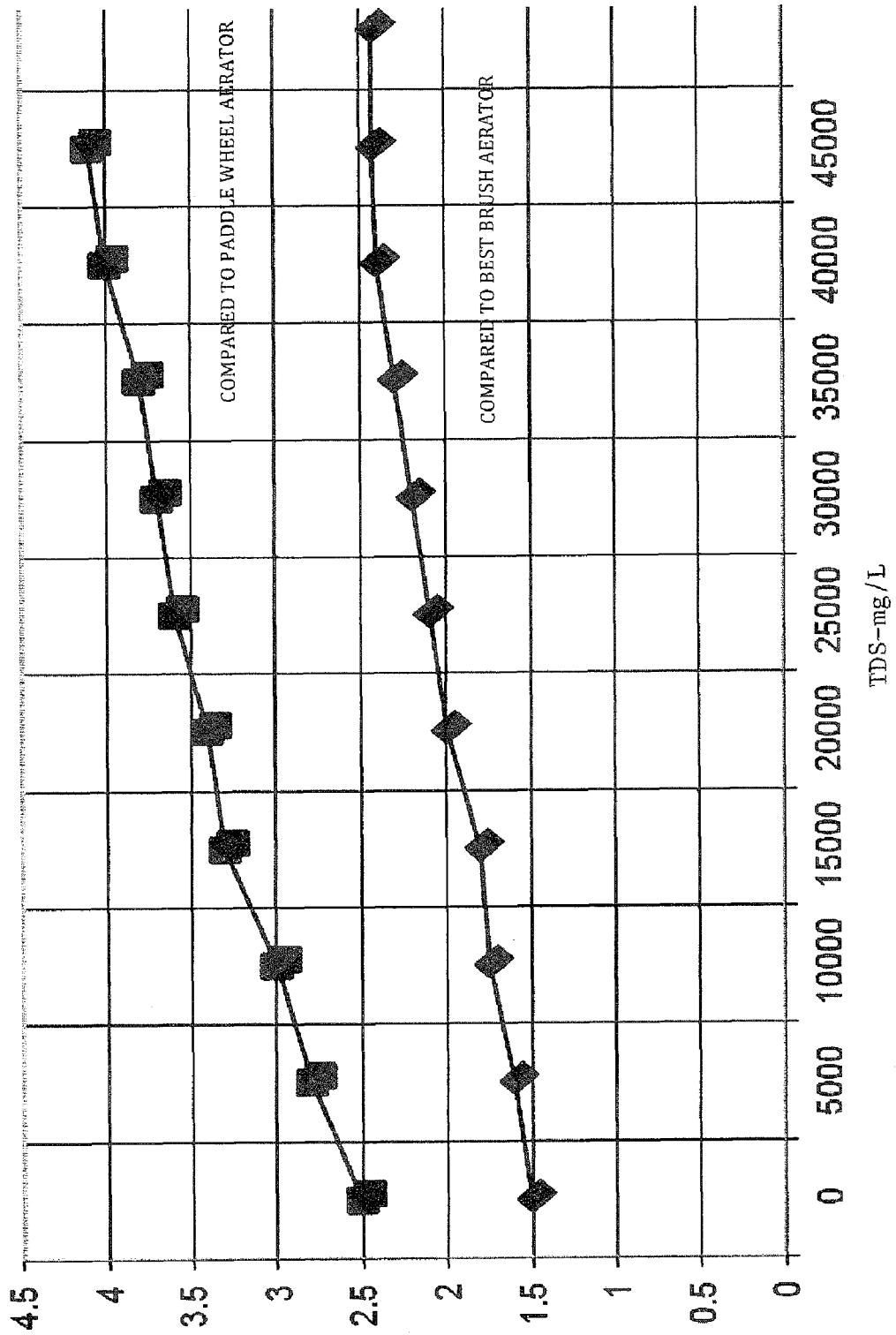
FIG. 1E is a representative graph showing the relationship between Standard Aeration Efficiency [SAE] and various Salt Concentration [TDS] values of the liquid medium.

FIG. 1D is a representative graph showing the relationship between Standard Aeration Efficiency [SAE] and various Salt Concentration [TDS] values of the liquid medium for most common aeration methods including Aero-Tube™. FIG. 1E is a representative graph showing the relationship between Standard Aeration Efficiency [SAE] and various Salt Concentration [TDS] values of the liquid medium for most common aeration methods including Aero-Tube™. An internationally recognized engineering firm conducted performance tests on the aeration tube in both fresh and salt water environments. In a controlled study, they compared an airlift aerator utilizing Aero-Tube™ technology with an equal horsepower paddle wheel and brush paddle wheel aerator, two of the most popular aeration technologies on the market today.

Aero-Tube™ performed extremely well in all areas, including its ability to transfer oxygen to water, expressed in terms of a standard oxygen rate [SOTR], and its efficiency in terms of pounds of oxygen per kilowatt-hour [the standard aerator efficiency or SAE Wire, rate].

In the fresh water testing, the Aero-Tube™ aerator exceeded the paddle wheel's energy efficiency [SAE Wire] by up to 2.6 times.

Aero-Tube™ aeration tubing performed even better in the salt water test. As the density of the water's salt content increased [from 5,000 mg to 35,000 mg], the oxygen advantage of the Aero-Tube™ system steadily rose. At 35,000 mg/L NaCl, the energy efficiency of Aero-Tube™ aerator was as much as 4.2 times the efficiency of the paddle wheel.

While performance of diffuser grids 130 may vary among different brands and models, in general diffuser grids 130 are considered one of the most effective and cost efficient aeration devices because nearly all of the energy used to deliver the air that goes through hoses 140 and hose segments 132 goes directly into the water/liquid medium. A paddle wheel, wastes energy by throwing water/liquid medium into the air to pick up oxygen.

Figure 2:
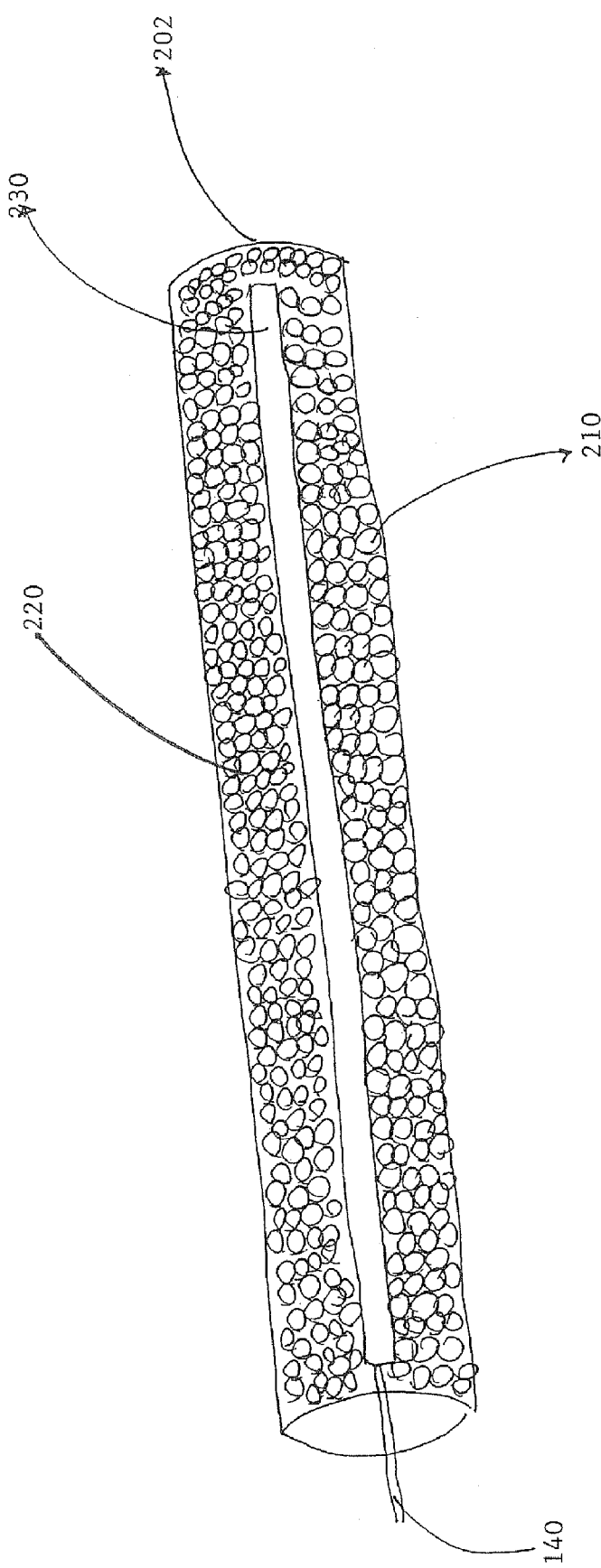
FIG. 2 is a representative upper front perspective view of an in situ bioreactor container 200 of floating bioreactor system 100 of the present invention.

FIG. 2 is a representative upper front perspective view of an in situ bioreactor tube or container 200 of floating bioreactor system 100 of the present invention. In summary, in situ bioreactor is a bio reactor paired with an aeration device such as a microbubble generator. The purpose of the microbubble generator is to generate highly oxygenated water which infuses microbes with the nutrients required to achieve very high levels of process and treatment effectiveness and efficiency. The accelerated regeneration of microbes accelerates the natural mineralization process, reducing treatment cycle times and virtually eliminating organic contaminant levels.

As best shown in FIG. 2, in one embodiment, in situ bioreactor tube container 200 has an external slotted pipe structure 220 which has lots of inner bores 220. Within each inner bore 220, enough microbial media 210 should be loaded. In one embodiment, there is aeration tubing 230 embedded within the slotted pipe structure 220. One end of aeration tubing 230 is connected to bioreactor hose 140 and subsequently to bioreactor pump 108. When the bioreactor pump 108 is on, it supplies air through aeration tubing 230 which tiny air bubbles are created. Air bubbles diffuse from the internal to the external surfaces of bioreactor 200 and ultimately disperse to the surrounding water/liquid medium via numerous inner bores 220 where microbial media 210 are contained. The air bubbles supply both oxygen and nutrients to microbial media 210 and eventually disperse them into the surrounding water/liquid medium.

Figure 3:
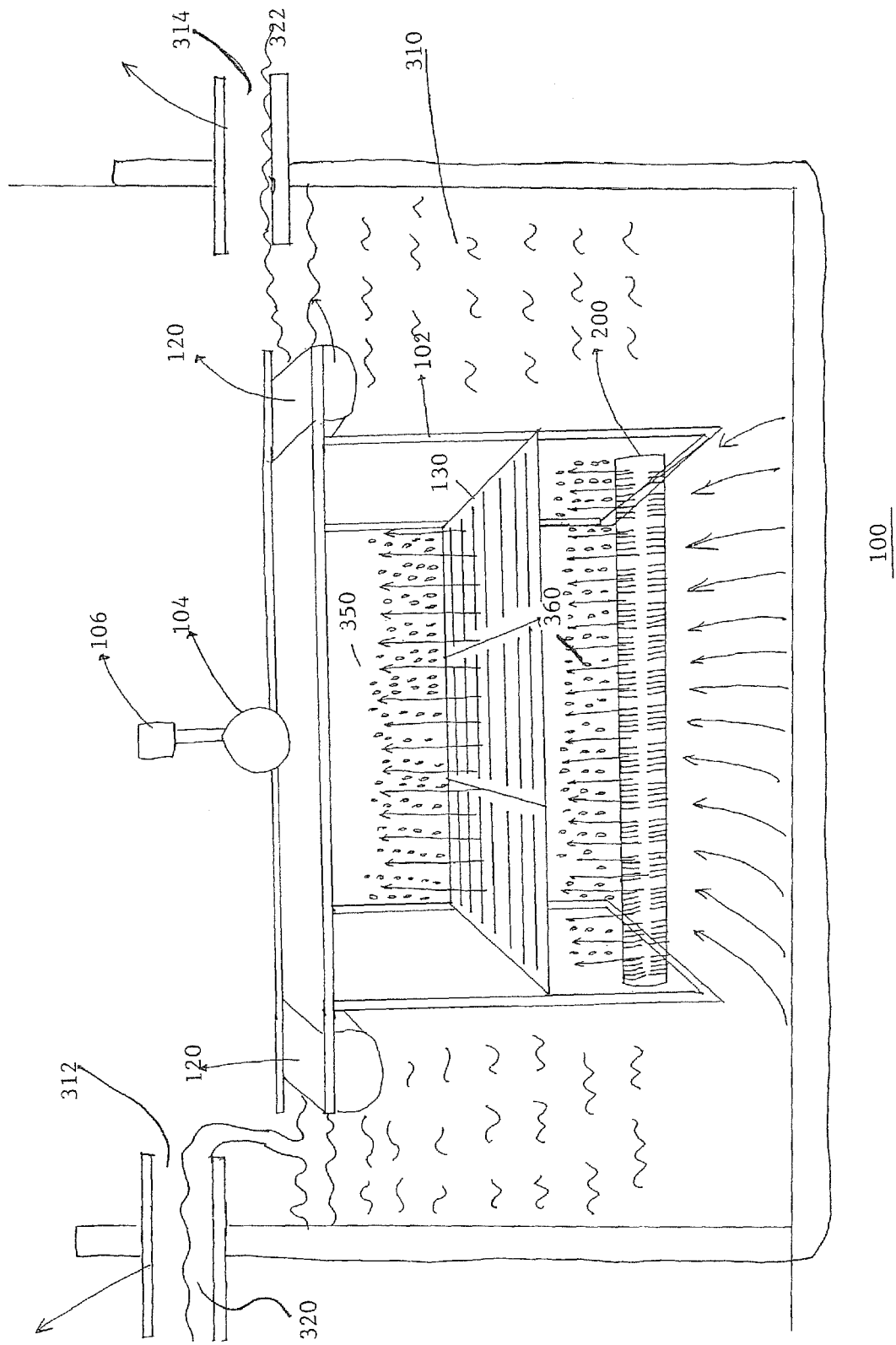
FIG. 3 is a representative view showing the method of application of the floating bioreactor system 100 of the present invention.

FIG. 3 is a representative view showing the method of application of the floating bioreactor system 100 of the present invention. As shown in FIG. 3, floating bioreactor system 100 of the present invention is installed and immersed in the treated liquid medium 310. The waste 320 is received via inlet pipe 312 and is discharged out through the outlet 314 after treatment. In one embodiment, housing 102 is suspended and floating with the assistance of floats 120 on both side. As best shown in FIG. 3, when the floating bioreactor system 100 is turned on, bioreactor 200 disperses microbes 360 which are originally contained in its inner bores 220. The tiny air bubbles 350 generated from aeration tubing 230 will further disperse microbes 360 out of the system while continuously supplying oxygen and nutrients to the microbes 360. Eventually, the microbes 360 dispersed from bioreactor 200 will establish themselves as the dominant species within the liquid medium 310 being treated.

While at the same time, tiny air bubbles 350 are generated continuously from diffuser grids 130. The fine air bubbles 350 are more readily absorbed into water per volume of air compared to coarse air bubbles. Consequently, oxygen content is much increased in the treated liquid medium 310. Moreover, the low head-loss of diffuser grids 130 combined with bioreactor 200 leads to a high efficacy for the microbial population to the liquid medium being treated.

As shown in FIG. 3, microbial population 360 is dispersed from bioreactor 200 and move vertically away from the bioreactor 200 towards diffuser grids 130. Air bubbles 350 released not only support the life of the microbes 360 but also help evenly dispense microbes 360 out to the liquid medium for treatment 310. As best shown in FIG. 3, the combination of diffuser grids 130 and bioreactor 200 and more importantly their relative orientation in floating bioreactor system 100 of the present invention greatly enhances the efficiency and effectiveness in treating liquid medium 310.

It will be understood that biosolids and/or sludge handling requirements are eliminated in the present invention. The biosolids are eaten up and consumed by the microbes, thus eliminating the need for sludge and biosolids handling equipment, disposal, etc. In addition, having the microbes on the surface of the water increases the efficiency of oxygen transfer in the floating bioreactor system 100.

Test Results:
Test Laboratory: Robinsons Land Corporation; Analysis No.: WA-10-217
Model: BioCleaner™ 1200 m3 system [16 HP]
Test Date Sample—Oct. 18, 2010; Analysis—Oct. 18-23, 2010
Sample Source: STP-Main Mall to be used in an aquarium. In one embodiment, aquarium bioreactor and aerator system 400 consists of air pump 414, air hose 413 and bioreactor and aerator combo 401. In one embodiment, air pump is a low wattage pump, approximately 2-3 watts, supplying air to in situ bioreactor and aerator combo 401 via air hose 413. In one embodiment, bioreactor and aerator combo 401 is completely submerged in the water 412. Preferably, approximately 150 grams by weight of bioreactor and aerator combo 401 should be used for an aquarium of 81 to 160 liters by volume. For smaller tanks with volume below 80 liters, 100 grams by weight of bioreactor and aerator combo 401 should be used.

To sufficiently aerate a 100 gallon tank, air pump 414 should be around 5 watts of power or approximately 0.07 watts of power per gallon of water. In one embodiment, regularly clean filter and the inner wall of the tank to prevent forming of biofilms. The system 400 works best in conjunction with a carbon filter 409.

The advantages of using aquarium bioreactor and aerator system 400 include no odor, no sedimentation, controlled water pH value, various set microbes for controlling nitrogen cycle, water and energy conservation, fishes that are more resistant to diseases, no need for mechanical filter and no chemicals needed.

| Quantitative Water Analysis | | | | |
|---|---|---|---|---|
| Sample Identification (Lab. Sample Nos.) | Influent (S10-WA-506) | Effluent (S10-WA-506) | DENR Effluent Standard for Inland Water Class C - "NPI" | Method of Analysis |
| pH, as received | 6.41 | 7.26 | 6.5-9.0 | Glass Electrode Method |
| Temperature, °C. | 27.6 | 28.3 | | Mercury-Filled Thermometer |
| Chemical Oxygen Demand (COD), mg/L | 780.49 | 25.68 | 100 maximum | Dichromate Reflux Method |
| Biochemical Oxygen Demand (5-days BOD), mg/L | 721.26 | <1 | 50 maximum | Azide Modification (Dilution Technique) |
| Settleable Solids, ml/L | n/a | 0.1 | 0.5 maximum | Volumetric (Imhoff Cone) Method |
| Dissolved Oxygen, mg/L | n/a | 6.58 | | Azide Modification (Winkler Method) |
| Total Coliform, MPN/100 ml | n/a | <2 | ≦10,000 maximum | Multiple Tube Fermentation Technique |

As shown in the above Test Result, which the experiment and analysis was carried out by an independent laboratory, after treatment by one of the models of floating bioreactor system 100 of the present invention, the overall quality of waste water improved significantly. Most notable results included the BOD reduction from over 700 mg/L in the influent sample to a mere <1 mg/L in the effluent sample. The value of Total Coliform [E. coli] was also reduced to <2 MPN/100 ml. Both values are way lower than the DENR Effluent Standard for Inland Water Class C—"NPI, making the effluent sample Class AA water, better or equivalent to drinking water quality in those respects. The waste water was treated only by floating bioreactor system 100 of the present invention with no chlorination, no filters, no sludge handling and no chemicals, pre or post treatment.

Figure 4A:
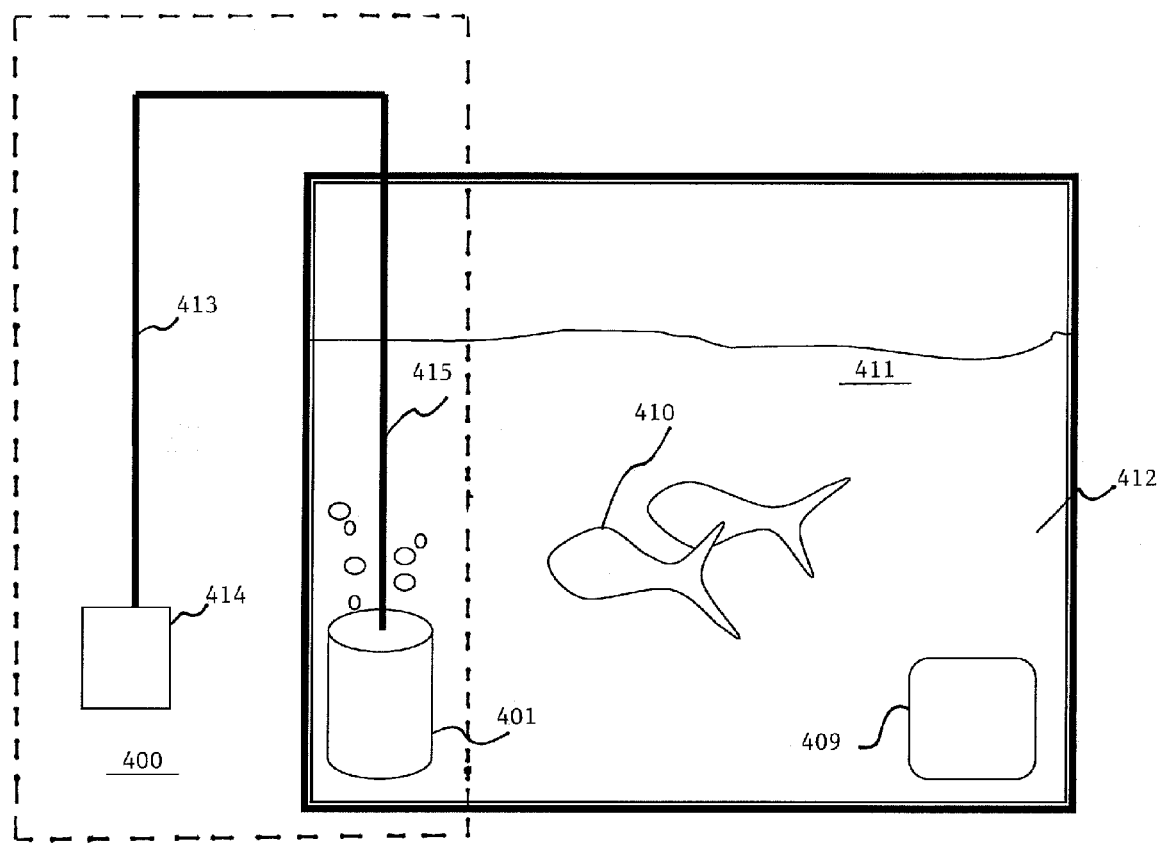
FIG. 4A is a representative view showing one method of adaption of an alternative embodiment, viz. aquarium bioreactor and aerator system 400.
Figure 4B:
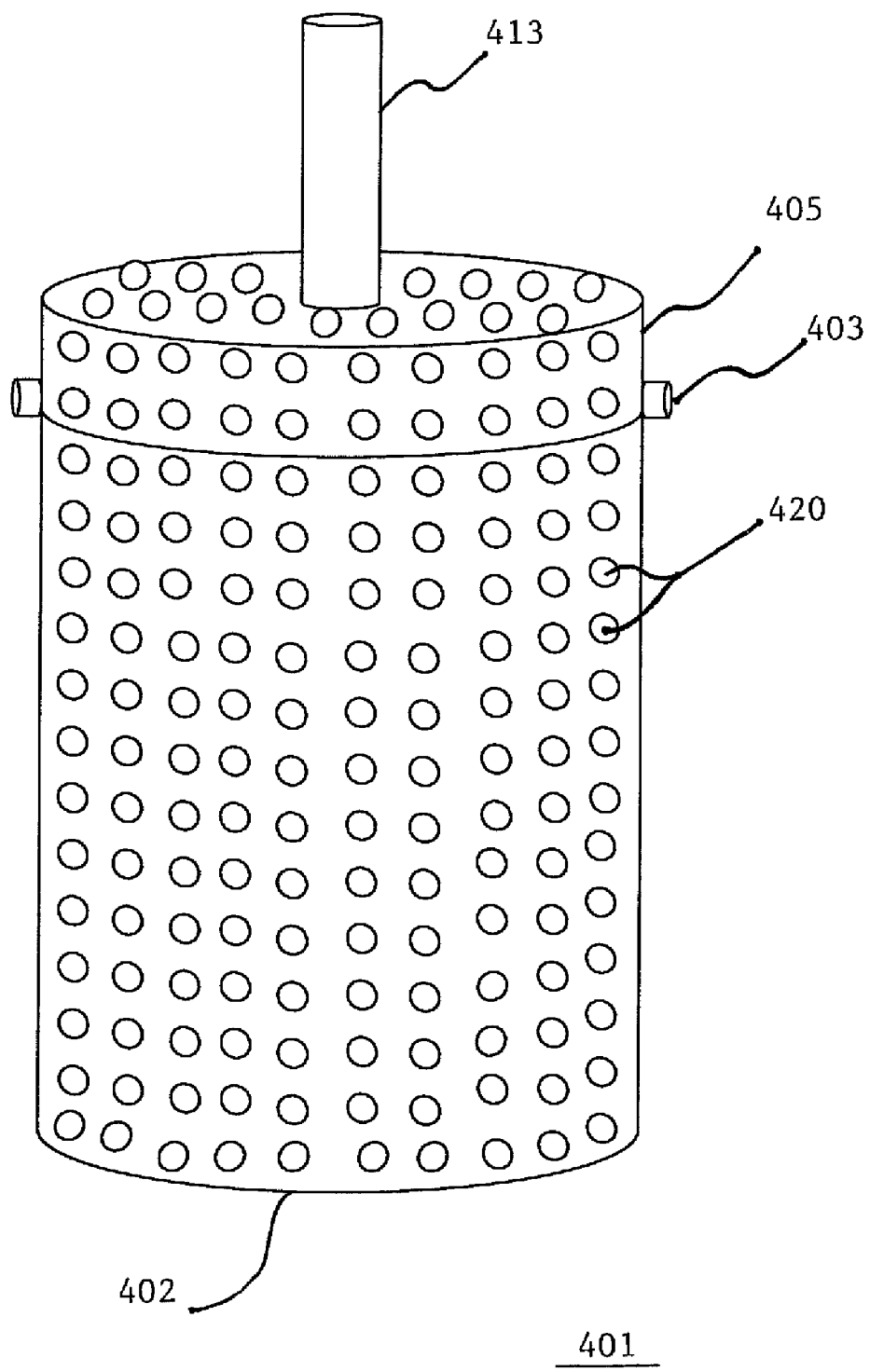
FIG. 4B is a representative side view of bioreactor and aerator combo 401 of aquarium bioreactor and aerator system 400.
Figure 4C:
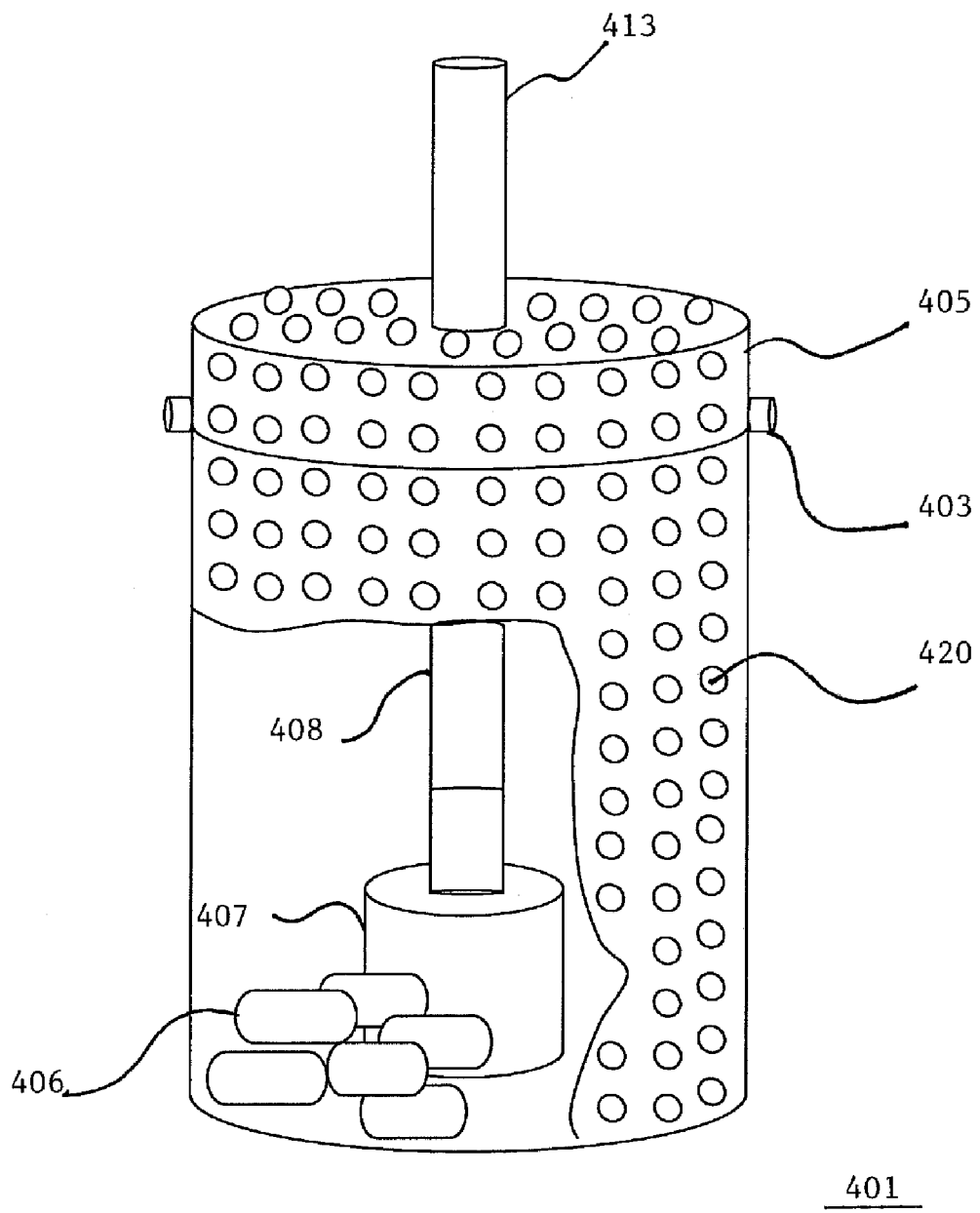
FIG. 4C is a representative side partially exposed view of bioreactor and aerator combo 401 of aquarium bioreactor and aerator system 400.

FIG. 4A is a representative view showing one method of adaption of an alternative embodiment, viz. aquarium bioreactor and aerator system 400. As shown in FIG. 4A, floating bioreactor system 100 of the present invention can be adapted FIG. 4B is a representative side view of bioreactor and aerator combo 401 of aquarium bioreactor and aerator system 400. FIG. 4C is a representative side partially exposed view of bioreactor and aerator combo 401 of aquarium bioreactor and aerator system 400. The main purpose of bioreactor and aerator combo 401 is to both generate tiny air bubbles for aeration and disperse microbes to clean up waste in aquariums. As shown in FIG. 4B, the exterior of bioreactor and aerator combo 401 is made of perforated stainless steel plate wherein numerous holes 420 are present. In one embodiment, bioreactor and aerator combo 401 is cylindrical in shape with approximate dimensions in the range of four inches by two and a half inches in diameter. As best shown in FIG. 4C, air generated from air pump 414 enters bioreactor and aerator combo 401 via hose 413 subsequently rubber hose 408 inside bioreactor and aerator combo 401. Air will then reach air diffuser 407 and tiny air bubbles 415 are generated. Air bubbles 415 will then reach surrounding microbial media 406 where appropriate types and amount of microbial is contained. Air bubbles 415 will provide oxygen and nutrients for the microbial population to thrive and also disperse them out of bioreactor and aerator combo 401 via holes 420. The microbes produced by bioreactor and aerator combo 401 will feed on the fish waste and other contaminant in the aquarium making the water 412 clearer and odorless.

Figure 5A:
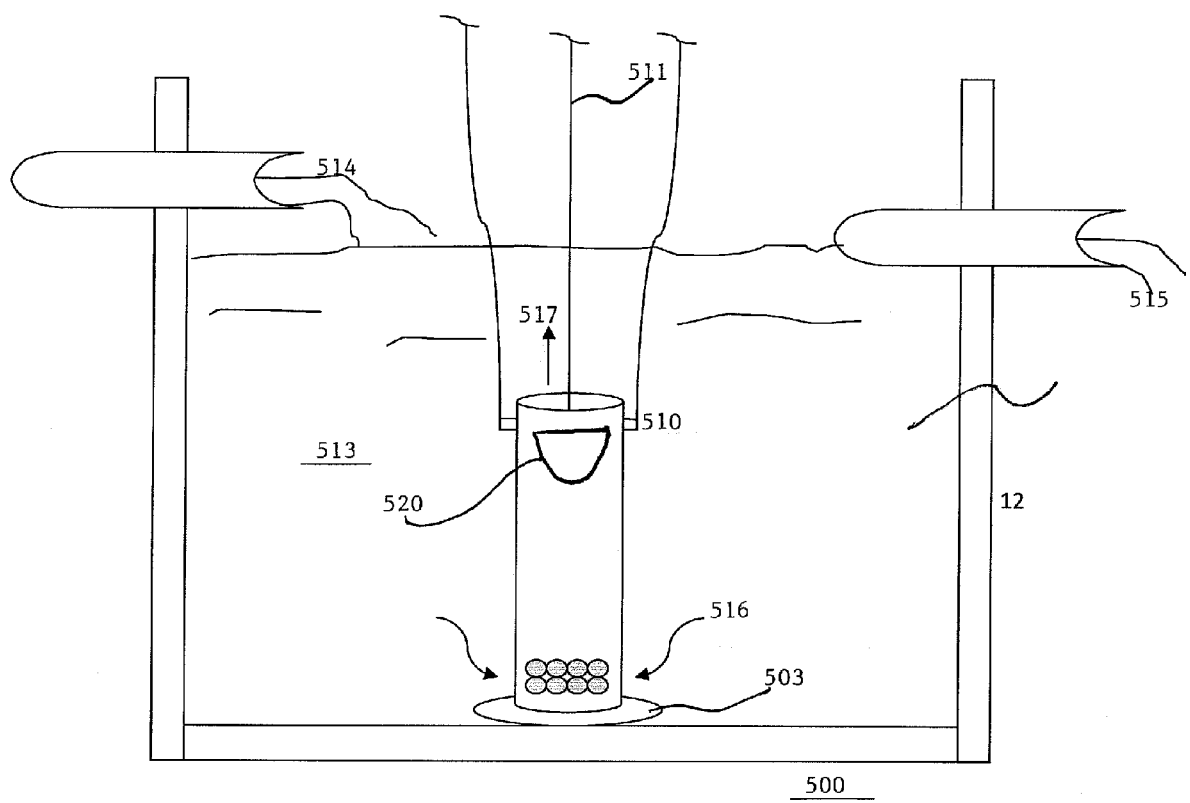
FIG. 5A is a representative view showing one method of adaption of an alternative embodiment, viz. home septic bioreactor and aerator system 500.

FIG. 5A is a representative view showing one method of adaption of an alternative embodiment, viz. home septic bioreactor and aerator system 500. Home septic bioreactor and aerator system 500 provides a method and apparatus for continuous, in-situ microbial seeding at the septic tank 512. As shown in FIG. 5A, home septic bioreactor and aerator system 500 consists essentially of home septic unit 501, air pump and air hoses 511. In one embodiment, home septic unit 501 is an immersible container which also serves as a bioreactor. Home septic unit 501 is immersed in the waste water 530 completely and is secured at the bottom of septic tank 512 at footing 503 by mechanical means. In one embodiment, home septic unit 501 is also attached to cables 510 for support at handle brackets 504 and has an air pump located above the septic tank 512.

Figure 5B:
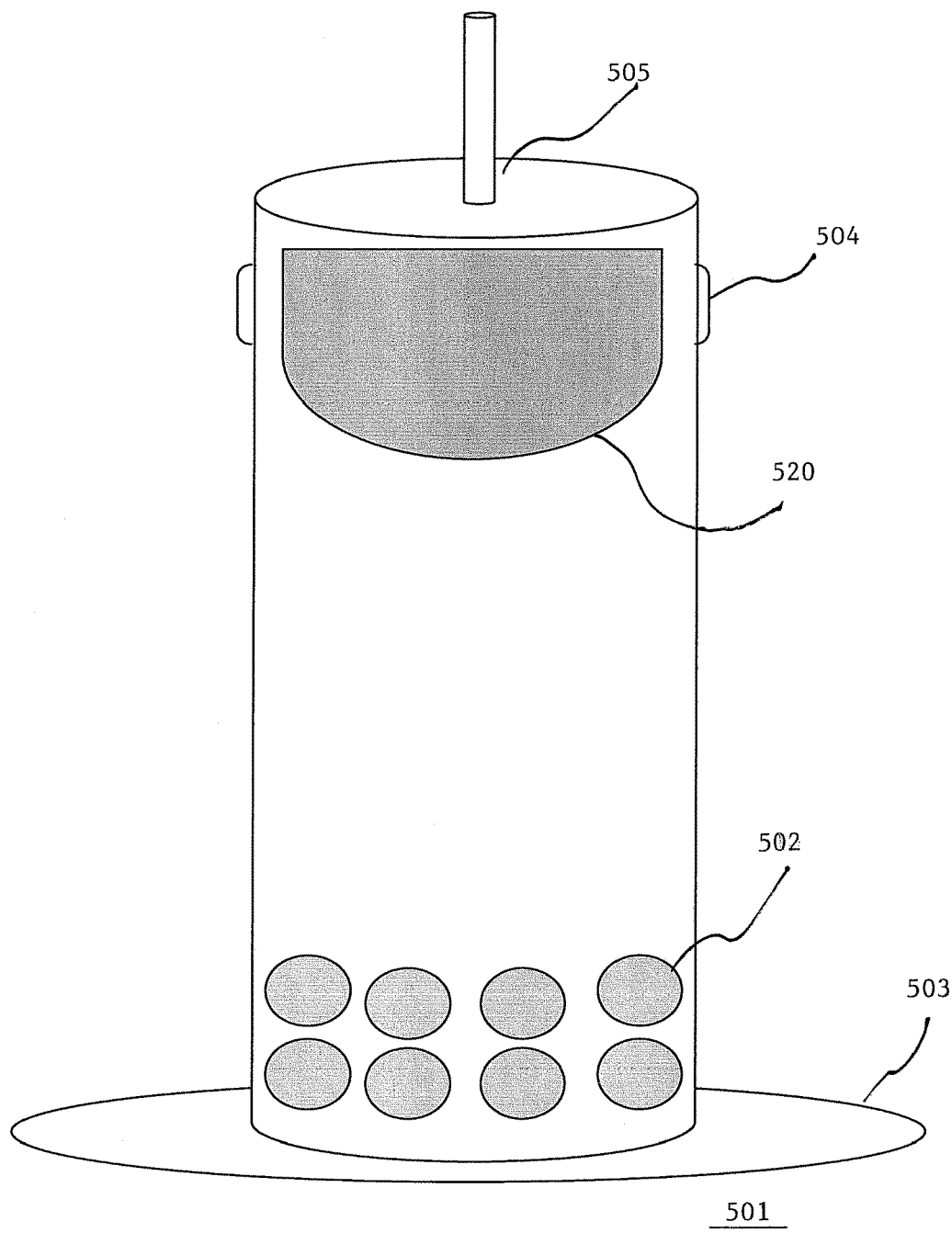
FIG. 5B is a representative side view of home septic unit 501 of home septic bioreactor and aerator system 500.
Figure 5C:
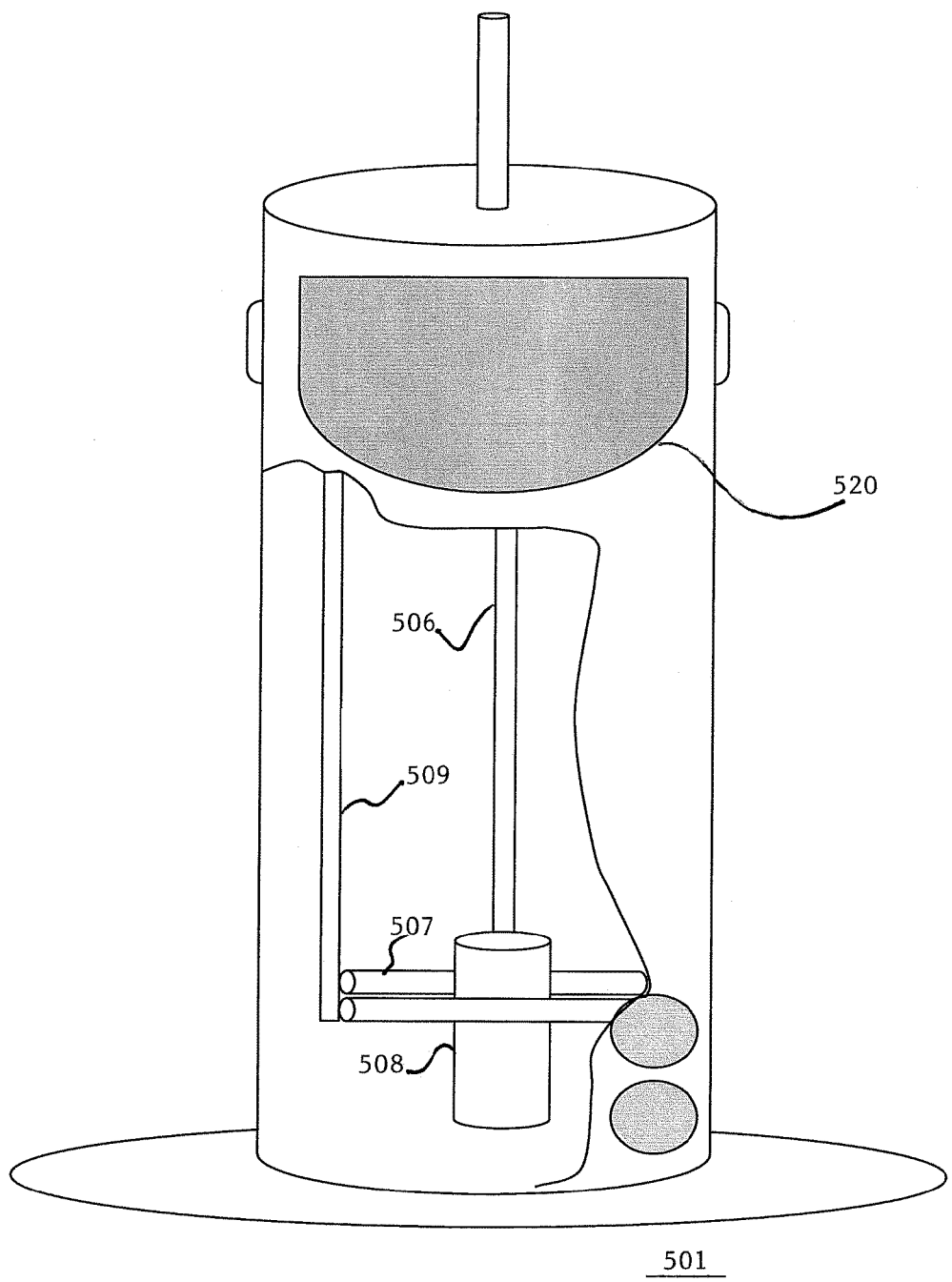
FIG. 5C is a representative side partially exposed view of home septic unit 501 of home septic bioreactor and aerator system 500.

FIG. 5B is a representative side view of home septic unit 501 of home septic bioreactor and aerator system 500. FIG. 5C is a representative side partially exposed view of home septic unit 501 of home septic bioreactor and aerator system 500. Although home septic unit 501 can be in any number of different configurations, in one embodiment, home septic unit 501 is a roughly cylindrical hollow container having a footing 503. As shown in FIG. 5B, home septic unit 501 has a cap 505 on top, numerous inlet holes 502 at the bottom and outlet opening 520 near the top half of the structure. In one embodiment, air enters home septic unit 501 via air hose 506 and diffuser hose 509. As shown in FIG. 5C, home septic unit 501 microbial media 507 in its core that store and produce the microbes. In one embodiment, a diffuser unit 508 is placed at the bottom of home septic unit 501, which is powered by air pump. Diffuser unit 508 generates tiny air bubbles that provide oxygen and nutrients to microbial that is contained in microbial media 507 and simultaneously creates vacuum that sucks in waste water 530 from inlet holes 503 at the bottom. Waste water 530 travels upward inside home septic unit 501 and is then released at the top via outlet opening 520. During the journey upward, waste water makes contact with the microbial media 507 in the process and carries with it microbial when it is released back to open water.

By continuous adding a desired microbial population directly into waste water 530 to be treated, the present invention 500 allows for demand growth and microbial acclimation based on the waste content within the said environment. The microbial agents generated by the present invention 500 are provided with a continuous supply of oxygen and/or nutrients by diffuser unit 508, such microbial agents can more effectively mineralize waste within an environment 530 being treated. The present invention 500 can specifically makes the septic tank 512 of houses into a small sewage treatment plant. Over time, the in-situ microbial addition provided by home septic bioreactor and aerator system 500 of the present invention shall make waste water 530 to acceptable discharge level.

Figure 6A:
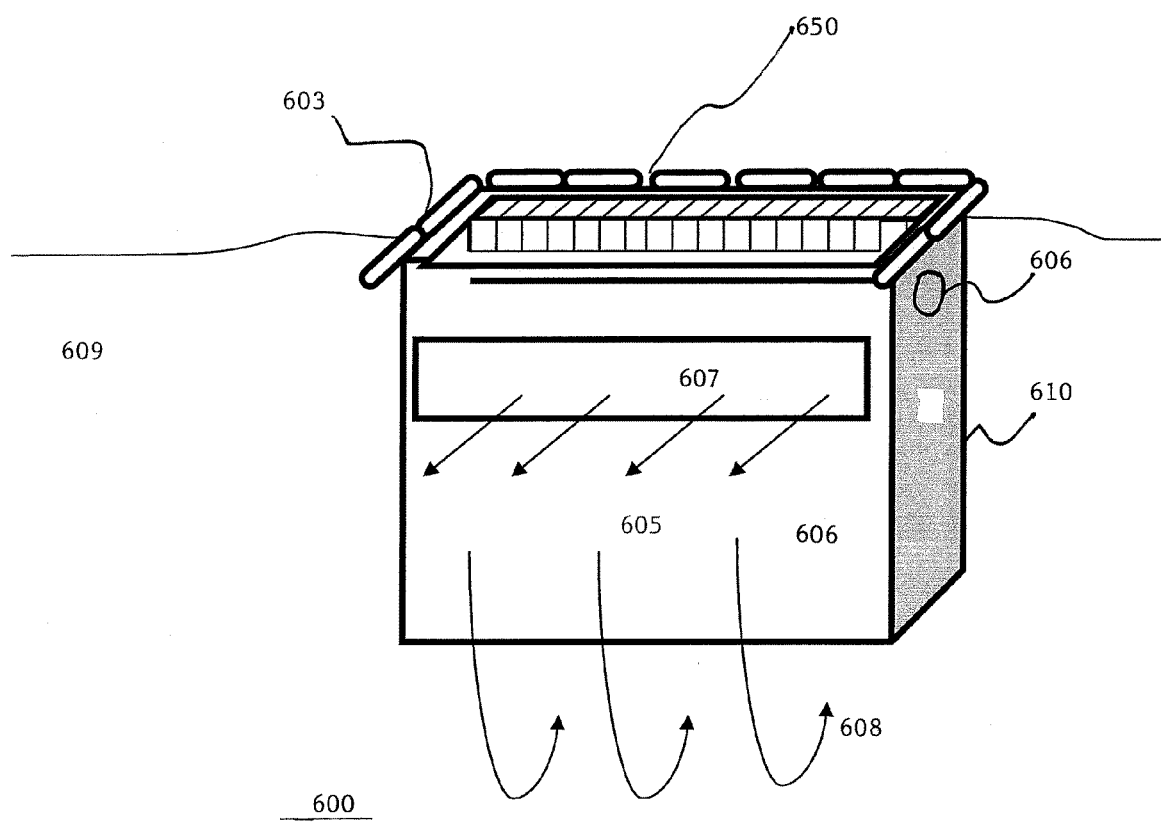
FIG. 6A is a representative view showing one method of adaption of an alternative embodiment, viz. aero dynamic mixer bioreactor and aerator system 600.
Figure 6B:
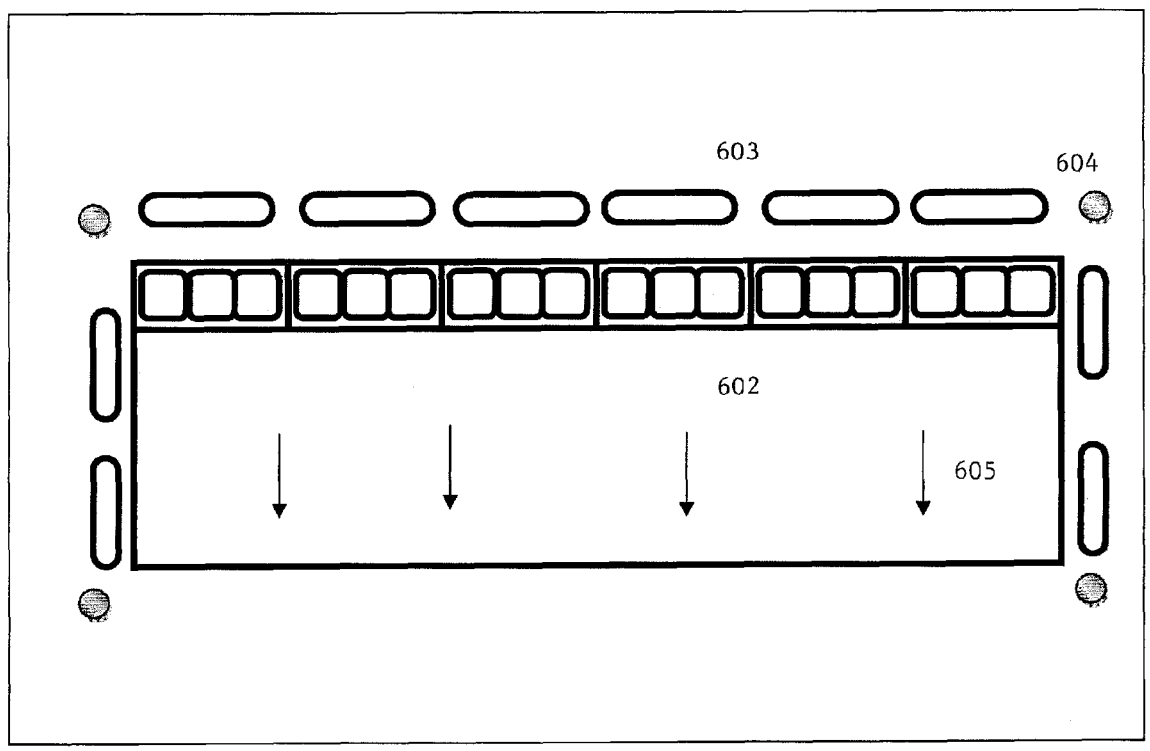
FIG. 6B is a representative side view of aero dynamic mixer 601 of aero dynamic mixer bioreactor and aerator system 600.

FIG. 6A is a representative view showing one method of adaption of an alternative embodiment, viz. aero dynamic mixer bioreactor and aerator system 600. FIG. 6B is a representative side view of aero dynamic mixer of aero dynamic mixer bioreactor and aerator system 600. In one embodiment, aero dynamic mixer bioreactor and aerator system 600 is an aeration device adapted to be used in outdoor environment such as lakes and ponds. As shown in FIG. 6A, aero dynamic mixer is basically a housing adapted to float within the liquid medium 609 such that the top portion remains above surface of the water/liquid medium 609. The airlift device has been known for many years and essentially operates by supplying air bubbles into the water at a predetermined depth below the surface. Some of this air is absorbed into the water, which causes the water to become less dense and rise towards the surface. The rising of the water causes circulation 608, which distributes the aerated water and brings additional water toward the device for aeration.

Water 609 is aerated in an airlift device by use of a diffuser. When the diffuser is submerged in water 609, the movement of gas through the device causes bubbles to emerge from the pores and into the water 609. In one embodiment, the aero dynamic mixer bioreactor and aerator system 600 uses a patented porous rubber houses as a diffuser.

The present invention 600 is comprised of a series of porous diffusers called Aerogrids™ arranged in a way that they are in a straight line. These aeration diffusers are positioned in fiberglass frames that are supported by floaters 603.

As best shown in FIG. 6B, above the surface are blowers 650 situated to give air to the diffusers. A skirt 606 varying in dimensions, depending on the depth of the medium, wraps around the device 600 in such a way it has openings 607 only at the top and bottom. A small opening 660 is also noticed on one side of the device 600 just below the surface. This will serve as a mouth to water 609 coming out created by the vacuum when the said present invention 600 is turned on. The present invention 600 is capable of drawing water 609 and recirculating it in a very potent manner. Also it is a mobile device that can easily hoist to a boat and move from one location to another.

Although the inventions herein is to be understood that these are merely illustrative of the principles and applications of the present inventions. Therefore, it is understood that numerous modifications may be made to the illustrative embodiments and that other modifications maybe devised without departing from the scope and functions of the inventions as defined by the claims to be followed.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. A portable, floating aeration and microbial reactor system for cleaning sewage water, the aeration and microbial reactor system comprising:

a rigid, semi-open and stable housing frame having two side walls and a back wall to half of its height, the housing frame further having a plurality of buoyant members attached on its sides such that the top portion of the housing frame remains afloat when it is submerged in sewage water of various density;

an aeration sub-system further having a blower attached mechanically and sitting on top of the housing frame, a flat aeration grid device extending horizontally across the entire width and attached in the bottom half of said housing frame, the aeration grid device further comprises a plurality of porous plastic pipes having a gas permeable wall of thermoset polymer particles and thermoplastic binder in a minor amount thereby bonding said polymer particles and creating a substantially uniform porosity through the pipe wall along the length of the pipe, said porosity provided by a plurality of micropores having an average diameter of about 0.001 inch to about 0.004 inch along the length of said pipe for diffusion of gas therethrough and transfer to a medium, said thermoset polymer particles having a mesh size of about 60 to about 140 mesh, a plurality of air hoses connecting said blower to said aeration grid device;

a microbial reactor sub-system further having an air pump attached mechanically and sitting on top of the housing frame, an elongated, tubular and externally perforated microbial reactor portion extending essentially horizontally across the entire width of said housing frame and underneath said aeration grid device, the microbial reactor portion further comprises an inner aeration tube powered by said air pump, an perforated outside tube further having a plurality of slots, microbial media containing live bacteria imbedded within said slots, an air hose connecting said air pump to said microbial reactor portion.

2. A portable, floating aeration and microbial reactor system for cleaning sewage water, the aeration and microbial reactor system comprising:

a rigid, semi-open and stable housing frame having two side walls and a back wall to half of its height, the housing frame further having a plurality of buoyant members attached on its sides such that the housing frame remains afloat when it is submerged in sewage water of various density;

an aeration sub-system further having a blower attached mechanically and sitting on top of the housing frame, a flat aeration grid device extending horizontally across the entire width and attached in the bottom half of said housing frame, the aeration grid device further comprises a plurality of porous plastic, said porosity provided by a plurality of micropores having an average diameter of about 0.001 inch to about 0.004 inch along the length of said pipe for diffusion of gas therethrough and transfer to a medium, a plurality of air hoses connecting said blower to said aeration grid device;

a microbial reactor sub-system further having an air pump attached mechanically and sitting on top of the housing frame, an elongated, tubular and externally perforated microbial reactor portion extending essentially horizontally across the entire width of said housing frame and underneath said aeration grid device, the microbial reactor portion further comprising an inner aeration tube powered by said air pump, an perforated outside tube further having a plurality of slots, microbial media containing live bacteria imbedded within said slots, an air hose connecting said air pump to said microbial reactor portion.

3. A portable, floating aeration and microbial reactor system for discontaminating water, the aeration and microbial reactor system comprising:

a rigid frame having an upper portion and a lower portion;

a plurality of buoyant members attached to the upper portion of the rigid frame such that the reactor system remains afloat when submerged in contaminated water;

an aeration sub-system coupled to the rigid frame, the aeration system comprising a blower attached mechanically to and sitting on the upper portion of the rigid frame, a flat horizontally-oriented aeration grid coupled to the rigid frame intermediate the upper portion and the lower portion thereof, the aeration grid further comprising microporous tubing having a plurality of micropores with an average diameter between about 0.001 inch and about 0.004 inch along the length of said microporous tubing for diffusion of gas therethrough and transfer to a medium, the aeration sub-system further comprising a plurality of air hoses connecting the blower to the aeration grid; and a microbial reactor sub-system having an air pump mechanically coupled to the upper portion of the rigid frame, the microbial reactor sub-system further comprising an elongated, tubular and externally perforated microbial reactor portion coupled to the lower portion of the rigid frame and extending essentially horizontally and underneath the aeration grid, the microbial reactor portion comprising an inner aeration tube powered by the air pump, a perforated outside tube having a plurality of slots extending therethrough, the microbial reactor portion further comprising microbial media containing live bacteria imbedded within said slots, the microbial reactor sub-system further having air hose connecting the air pump to the microbial reactor portion.

4. The portable, floating aeration and microbial reactor system of claim 3 installed in an outdoor stream.

5. The portable, floating aeration and microbial reactor system of claim 3 installed in an outdoor pond.

6. The portable, floating aeration and microbial reactor system of claim 3 installed in an settling pond.

7. The portable, floating aeration and microbial reactor system of claim 3 in conjunction with an aerodynamic mixing system for decontaminating waste water.

\* \* \* \* \*